United States Patent [19]

Kuroda

[11] Patent Number: 4,628,371
[45] Date of Patent: Dec. 9, 1986

[54] DROP-OUT COMPENSATOR FOR A RECORDED SIGNAL PLAYBACK SYSTEM

[75] Inventor: Kazuo Kuroda, Tokorozawa, Japan
[73] Assignee: Pioneer Electronic Corporation, Tokyo, Japan
[21] Appl. No.: 562,522
[22] Filed: Dec. 19, 1983
[30] Foreign Application Priority Data Dec. 25, 1982 [JP] Japan ............................ 57-197673[U]

[51] Int. Cl.$^4$ ............................................. H04N 5/76
[52] U.S. Cl. .................................. 360/38.1; 358/341; 358/336; 360/19.1
[58] Field of Search ............... 358/314, 336, 342, 343, 358/341; 360/19.1, 38.1

[56] References Cited
U.S. PATENT DOCUMENTS 4,085,426 4/1978 Aigrain et al. ...................... 358/336
4,119,812 10/1978 Fox .................................. 358/336 X Primary Examiner—Robert L. Richardson
Attorney, Agent, or Firm—Schwartz, Jeffery, Schwaab, Mack, Blumenthal & Evans

[57] ABSTRACT

A drop-out compensator to be incorporated in a system for playing back main channel signals and sub channel signals from a recording medium, the signals having been recorded in the form of a multiplex signal, comprises a drop-out sensor for generating a drop-put sensor signal to be applied to a drop-out compensator circuit provided in a transmission line of a playback main channel signal, and delay means connected to the drop-out sensor for generating a second drop-out sensor signal to be applied to a drop-out compensator circuit provided in a transmission line of a playback sub channel signal.

2 Claims, 8 Drawing Figures

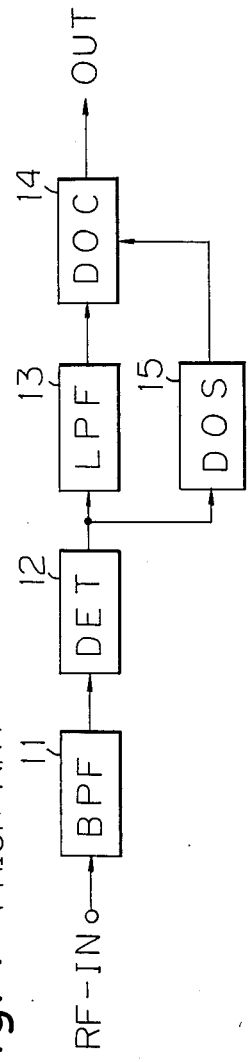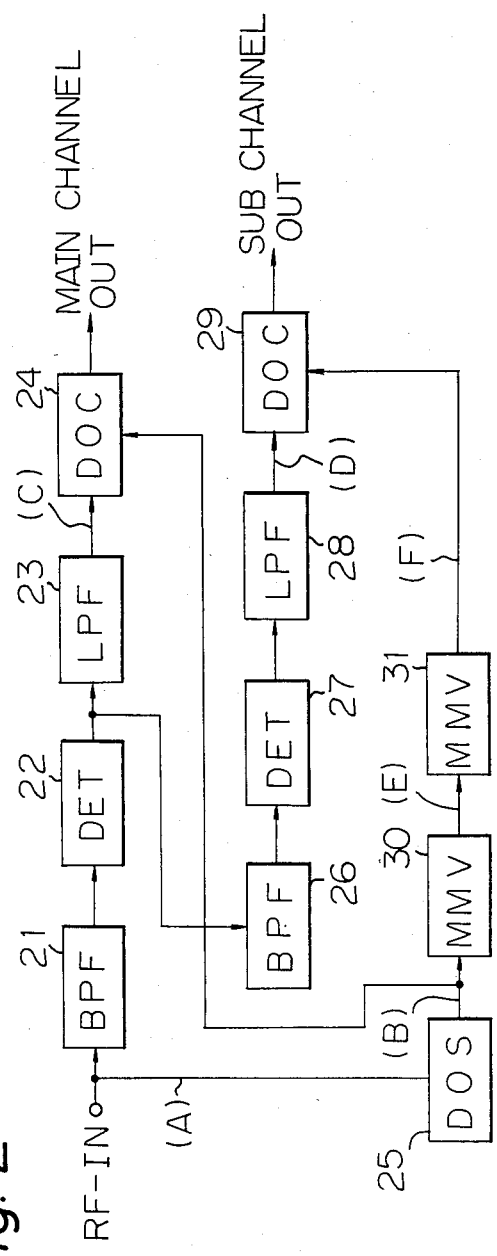

DROP-OUT COMPENSATOR FOR A RECORDED SIGNAL PLAYBACK SYSTEM

BACKGROUND OF THE INVENTION

1. Field of the Invention

The present invention relates to a drop-out compensator, and more specifically to a drop-out compensator to be incorporated in a system for playing back signals recorded in a recording medium in the form of a multiplex recording signal.

2. Description of Background Information

In systems for playing back recorded information, it is quite necessary to provide a drop-out compensator because the drop-out is inevitable in a signal picked up from a recording medium. It is well known that the drop-out compensation is very important in the case of the video signal. However, in the case of video disc player system, it is common to provide a drop-out compensator also for the playback audio signal, since the audio signal is recorded generally with the video signal by means of a frequency multiplex system. More particularly, two independent audio signals of a main channel are recorded by using a couple of carrier signals having the frequency of 2.3 MHz and 2.8 MHz, for example.

Furthermore, if it is required to record two additional audio signals of a sub channel, a sub carrier having a frequency out of the frequency range of the main channel signal is utilized and the subcarriers modulated by the sub channel signals are superposed on the main channel signals of the audible signal range.

Since prior art drop-out compensators for the player system of this type are designed only for the signals within the range of the main channel signal, such as the audible signal range, it was difficult to apply a signal having a subcarrier component to the prior art drop-out compensators. If a signal having the subcarrier signal component is applied to the prior art drop-out compensator, the subcarrier signal component is supressed during the compensating operation, and a hold level of the main channel signal becomes incorrect due to the presence of the subcarrier component. These will result in the generation of noise signals both in the main channel signals and in the sub channel signals.

SUMMARY OF THE INVENTION

An object of the present invention is therefore to provide a drop-out compensator, which is usable for a signal including a subcarrier component out of the range of the main channel signal, and which can perform very accurate drop-out compensation of the main channel signal and the sub channel signal.

Another object of the present invention is to provide a drop-out compensator capable of the above operations, which can be realized by using a simple circuit construction.

According to the present invention, a drop-out compensator for a system for playing back a main channel signal and a sub channel signal from a recording medium which signals having been recorded by passing through a step for superposing a sub carrier signal modulated by the sub channel signal on the main signal, is constructed to produce a first drop-out sensor signal by detecting a drop-out of a signal in a transmission line of the main channel signal, and second drop-out sensor signal for the drop-out compensation of the sub channel signal a predetermined time after the generation of the first drop-out sensor signal.

Further scope of applicability of the present invention will become apparent from the detailed description given hereinafter. However, it should be understood that the detailed description and a specific example, while indicating a preferred embodiment of the invention, is given by way of illustration only, since various changes and modifications within the spirit and scope of the invention will become apparent to those skilled in the art from this detailed description.

BRIEF DESCRIPTION OF THE DRAWINGS

The present invention, both as to its organization and manner of operation, together with further objects and advantages thereof, may best be understood by reference to the following description taken in connection with the accompanying drawings, in which:

FIG. 1 is a block diagram showing an example of the circuit construction of the prior art drop-out compensator;

FIG. 2 is a block diagram of an embodiment of the drop-out compensator according to the present invention.

DETAILED DESCRIPTION OF THE PREFERRED EMBODIMENTS

Figure 3A:
FIGS. 3A to 3F are waveform diagrams showing the waveform of the signals (A) to (F) which appear at various points of the circuit of FIG. 2.

Before entering into the explanation of the preferred embodiment of the device according to the present invention, reference is first made to FIG. 1, in which a block diagram of an audio signal reproducing part of a video disc player system is illustrated.

As shown, an RF (Radio Frequency) signal obtained at a pickup means such as a photo detector is applied to a Band Pass Filter (BPF) 11 in which signal components having the frequency of an audio carrier signal and the frequency adjacent thereto are picked up from the input signal. The thus picked up signal is then applied to an FM detector 12 in which the input signal is treated by an FM detection process and transformed to an audible signal to be applied to a Low Pass Filter (LPF) 13. In the LPF 13, frequency components of the input signal which are out of the audible signal range, especially in higher frequency range, are rejected to suppress the noise component. An output signal of the LPF 13 is then applied to a drop-out compensator (DOC) 14 which performs the compensation operation in accordance with a drop-out detection signal produced at the drop-out sensor (DOS) 15. More specifically, the DOC 14 includes an analog switch which is to be turned off by the drop-out detection signal and a hold capacitor connected between an output terminal of the analog switch and a circuit point of a predetermined reference voltage level. The operation of this system is as follows. When the drop-out sensor output signal is present, the level of the LPF 13 at a moment directly before the generation of the drop-out sensor output signal, is held and transmitted to the DOC 14 so as to execute the drop-out compensation. In addition, an output signal of the detector 12 is used as the input signal of the drop-out sensor 15 so that the sensor output signal is produced by detecting a high frequency noise signal which appears in the detection output signal upon occurrence of the drop-out phenomenon.

In the case of the video disc, the audio information is recorded as a two channel information in most cases. As an example, an FM modulation of a carrier signal of 2.3 MHz is performed in accordance with an information of a first channel and also an FM modulation of a carrier signal of 2.8 MHz is performed in accordance with an information of a second channel. In addition to the recording of the information of two channels, trials have been made for a multiple recording of two further channels of information. In one case, subcarrier signals of 47.2 KHz, for example, are treated by the FM modulation process according to information of additional third and fourth channels. After that, these FM signals are respectively superposed on the audio signals of the first and the second channel. Further, the above mentioned carrier siganals of 2.3 and 2.8 Hz are modulated in accordance with these audio signals by an FM modulation process and the thus obtained signals are recorded on the recording disc with the video information signal. The above described system for recording four channels of audio information is disclosed in Japanese Patent Application, No. 57-191110 which is assigned to the same applicant.

Reference is now made to FIG. 1 once more. The cut-off frequency of the LPF 13 is selected to a value higher than the subcarrier signal so that the frequency characteristics within the audible signal range, is not deteriorated by the LPF 13 and the information of the sub channel is not destroyed.

In this state, when the drop-out compensation is performed by the DOC 14, the subcarrier signal which incorporates the information of the sub channel is interrupted to cause a generation of noise signal at a detection stage of the sub channel. As for the main channel signal on which the subcarrier signal is superposed, the compensation of the level becomes incorrect because of the shift of the hold level during the drop-out compensation. This is because the hold level is varied depending on the level of the subcarrier signal which is modulated by the sub channel signal. Thus, noise is also produced in the case of the main channel signal due to the incorrectness of the compensation of the level.

In order to eliminate this drawback, it is conceivable to effect the drop-out compensation separately to the main channel and to the sub channel. However, that would cause a considerable increase of the cost of the system. In addition, it is also conceivable to utilize the sensor output signal of the compensation of the main channel signal for the compensation of the sub channel signal. However, the timing of the generation of the sub channel signal is delayed from the timing of the main channel signal by a value of ten and some micro seconds due to the delay characteristics of the Band Pass Filter (BPF) for picking up the sub channel signal. Therefore, it is difficult to use a single sensor output signal for both of the drop-out compensation of the main channel signal and the sub channel signal. If the duration of the drop-out deteciton signal is prolonged so that it can be used for the drop-out compensation of both of the main channel and the sub channel, that would result in an increase of the period of the drop-out compensation which causes deterioration of sound quality.

The embodiment of the drop-out detection signal generating device of the present invention will be explained with reference to FIG. 2 hereinafter.

As shown, an RF signal from a pickup means such as a photo detector is applied to a Band Pass Filter (BPF) 21 in which only components of the input signal having the frequency of audible signal range and the frequency adjacent thereto are picked up. An output signal of the BPF 21 is then applied to an FM detector 22 in which an input signal is treated by an FM detection process and transformed to an audible signal to be applied to a Low Pass Filter (LPF) 23. This audible signal from the FM detector 22 includes a subcarrier signal modulated by a sub channel signal, in addition to the main channel signal. This audible output signal from the detector 22 is then applied to a Low Pass Filter (LPF) 23 which transmits only the main channel signal component. An output signal of the LPF 23 which is indicated by (C) is then applied to the drop-out compensator (DOC) 24 for the signal of the main channel. The audible signal from the FM detector 22 is also applied to a Band Pass Filter (BPF) 26 in which the subcarrier signal is picked up. The thus picked up subcarrier signal is then applied to a detector (DET) 27 and demodulated to a sub channel signal of the audible signal range. The sub channel signal is then applied to a Low Pass Filter (LPF) 28 provided for suppressing the noise component. An output signal of the LPF 28 which is indicated at (D) is then applied to a drop-out compensator (DOC) 29 for the sub channel. The drop-out compensator (DOC) 24 as well as the DOC 29 is made up of an analog switch and a hold capacitor which is connected between an output terminal of the analog switch and a circuit point of a predetermined reference voltage. The system is further provided with a drop-out sensor (DOS) 25 which detects the decrease of the level of the input RF signal (A) and produces a sensor output signal (B) which controls the operation of the drop-out compensators 24 and 29. Furthermore, there is provided a retriggerable monostable multivibrator (retriggerable MMV) 30 which is triggered in accordance with the timing of the generation of the sensor output signal (B). In addition, another retriggerable monostable multivibrator (retriggerable MMV) 31 is provided so as to be triggered at the timing of the generation of the output signal (E) of the retrigerable MMV 30. An output signal (F) of the second retriggerable MMV 31 is then used as a sensor output signal to be applied to the drop-out compensator 29 for the sub channel signal.

Referring to FIGS. 3A to 3F which respectively show the waveform of the signals (A) to (F) shown in the block diagram of FIG. 2, the operation of the system will be explained hereinafter.

Figure 3B:
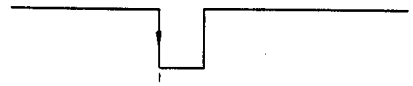
Figure 3C:
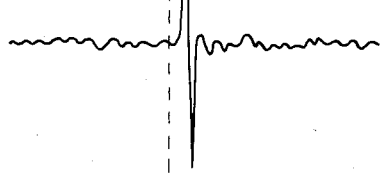

As shown in FIG. 3A which illustrates the envelope of the playback RF signal, the amplitude of the envelope decreases instantly when a drop-out occurs. Therefore, the first drop-out detector 25 detects this level down and produces a detection pulse signal such as shown in FIG. 3B. On the other hand, FIG. 3C shows the output signal of the LPF 23 which includes a noise signal of high amplitude due to the drop-out. It is to be noted that the timing of this noise signal is delayed from the timing of the occurence of the drop-out shown in FIG. 3A, because of the time constant characteristics of the FM detector 22 and the LPF 23. In accordance with the drop-out detection signal from the first drop-out detector 25 which is shown in FIG. 3B, the drop-out compensator 24 is actuated to hold the level of the input signal just before the generation of the drop-out detection signal and transmits the same as the output signal, during the period in which the drop-out detection signal is present.

Figure 3D:

Also the sub channel signal obtained at the output terminal of the LPF 28 has a waveform of FIG. 3D which includes a noise signal component. As shown, the delay of this noise signal is greater than that of the main channel signal, due to the delay characteristics of the BPF 26, DET 27, and the LPF 28. Further, magnitude of this delay time is greatly affected by the selection of the cut off frequency of the LPF 28. Moreover, since the frequency range of the playback sub channel signal is different from that of the playback main channel signal, the cut off frequency of the LPF 28 is generally selected at around 10 KHz which is considerably low in comparison with the cut off frequency of 20 KHz of the LPF 23. In this case, the timing of the noise component in the sub channel signal is further delayed due to an increase in the delay time of LPF 28.

Figure 3E:
Figure 3F:
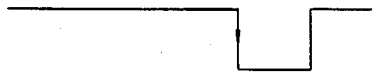

The retriggerable MMV's 30 and 31 are provided for the purpose of compensating for this delay of the occurence of the noise signals. As shown in FIG. 3E, the retriggerable MMV 30 is triggered by the output signal of the drop-out detector 25 and produces a pulse signal (E) of a predetermined pulse width. As shown in FIG. 3F, the retriggerable MMV 31 is in turn triggered by a trailing edge of the pulse signal (E) and produces a pulse signal (F) of a second predetermined pulse width which is usable as a second sensor output signal. The drop-out compensator 29 for the sub channel is operated in accordance with the thus produced second sensor output signal. Therefore, by suitably selecting the pulse width of the retriggerable MMV's 30 and 31, it becomes possible to effectively compensate for the noise signal component contained in the sub channel signal due to the drop-out. In addition, FIGS. 3C and 3D exemplary illustrate signals having frequency components only in the higher part of the audible range.

Although two stages of retriggerable MMV's 30 and 31 are employed to produce the second sensor output signal (F) in the case of the above embodiment, it is needless to say that the other type of delay means may be used instead of the retriggerable MMV's. Further, the output signal of the BPF 21 or output signal of the FM detector 22 may be applied to the input terminal of the drop-out detector 25 instead of the playback RF signal.

It will be appreciated from the foregoing that according to the present invention a single drop-out detector is uitlized to produce two drop-out detection signals. More particularly, by utilizing the fact that the sub channel signal is delayed against the main channel signal by a predetermined delay time, the second drop-out detection signal is produced by delaying the transmission of the first drop-out detection signal.

Therefore, the circuit construction of the present system is simplified to reduce the manufacturing cost of the system as well as the consumption of the power current.

Further, since the circuit portion for detecting the sub channel signal, namely from the BPF 26 to the DOC 29, is directly applied with the output signal of the DET 22, the cut off frequency of the LPF 23 can be selected below the upper end of the frequency range of the sub channel signal. This means that there is a great advantage that no sub channel component is contained in the output signal of the LPF 23 and the hold level of the DOC 24 is no longer affected by the level of the sub carrier signal. Thus, very accurate compensation of the drop-out has become possible.

It should be understood that the foregoing description is for illustrative purpose only, and is not intended to limit the scope of the invention. Rather, there are numerous equivalents to the preferred embodiments, and such are intended to be covered by the appended claims.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

What is claimed is:

1. A drop-out compensator for a system for playing a recording medium carrying an RF signal having a component modulated by a main channel audio signal and a sub carrier signal modulated by a sub channel audio signal comprising:

an input means for receiving an RF signal read from said recording medium;

first demodulating means connected to said input means for demodulating said RF signal and producing a first demodulation signal including said main channel audio signal and said sub carrier signal;

a drop-out sensor connected for sensing one of a drop-out of said RF signal and a drop-out of said first demodulation signal and for producing a drop-out sensing signal;

first separating means connected to said first demodulating means for separating said main channel audio signal from said first demodulation signal, said separating means having a delay characteristic of a first delay time;

a first drop-out compensator connected to said first separating means, for compensating for a drop-out of said main channel audio signal in accordance with said drop-out sensing signal;

second demodulating means connected to said fist demodulating means for demodulating said first demodulation signal and producing a second demodulation signal including said sub channel audio signal;

second separating means connected to said second demodulating means for separating said sub channel audio signal from said second demodulation signal, said second separating means having a delay characteristic of a second delay time longer than said first delay time;

delay means responsive to said drop-out sensing signal, for producing an additional drop-out sensing signal by delaying the transmission of said drop-out sensing signal, said delay of transmission being substantially equal to the difference between said first delay time and said second delay time;

a second drop-out compensator connected to said second separating means, for compensating for a drop-out of said sub channel audio signal in accordance with said additional drop-out sensing signal.

2. A drop-out compensator as set forth in claim 1, wherein said delay means is a pair of retriggerable monostable multivibrators connected in series with each other.

* * * * *